United States Patent Office 3,110,109
Patented Nov. 12, 1963

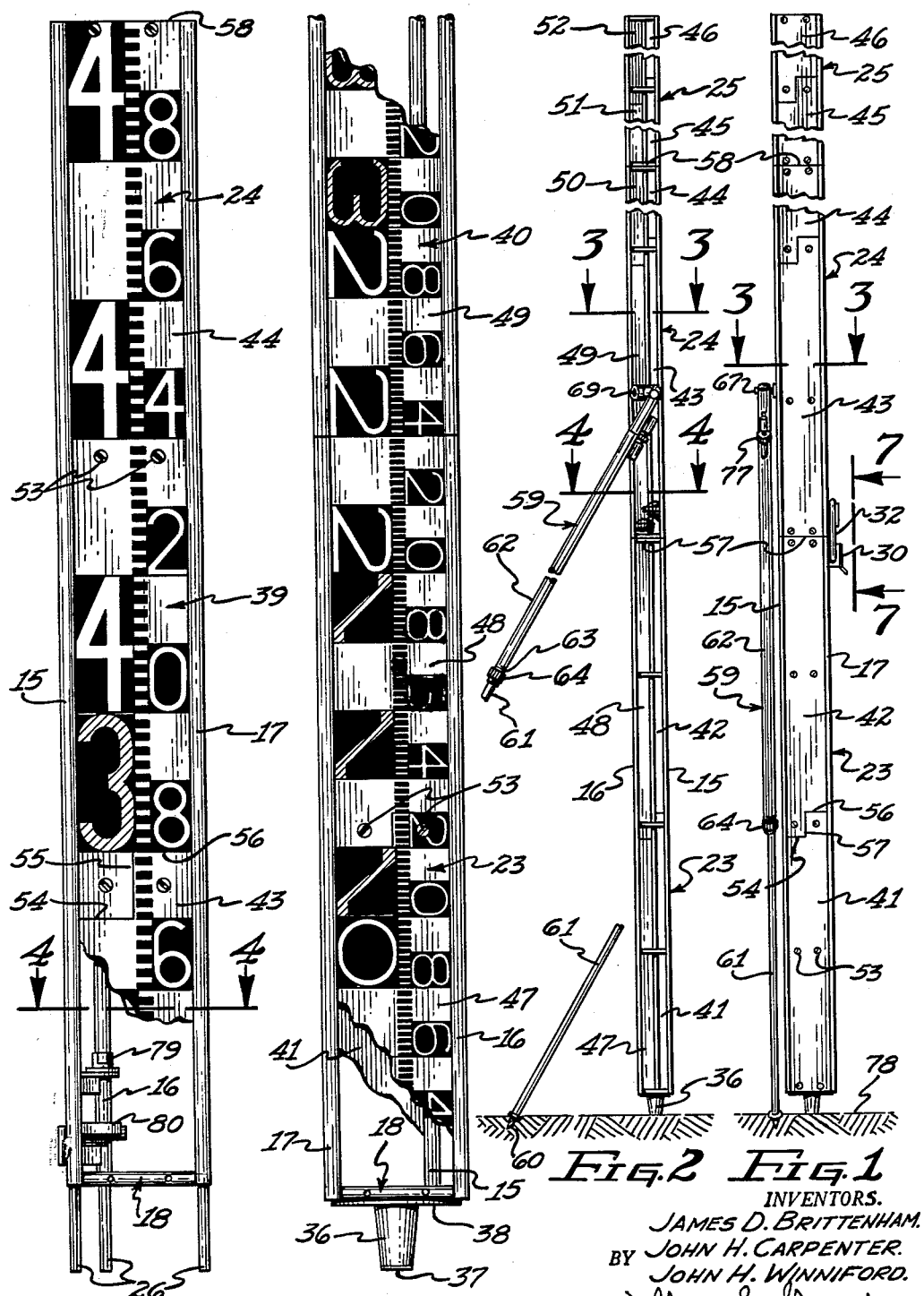

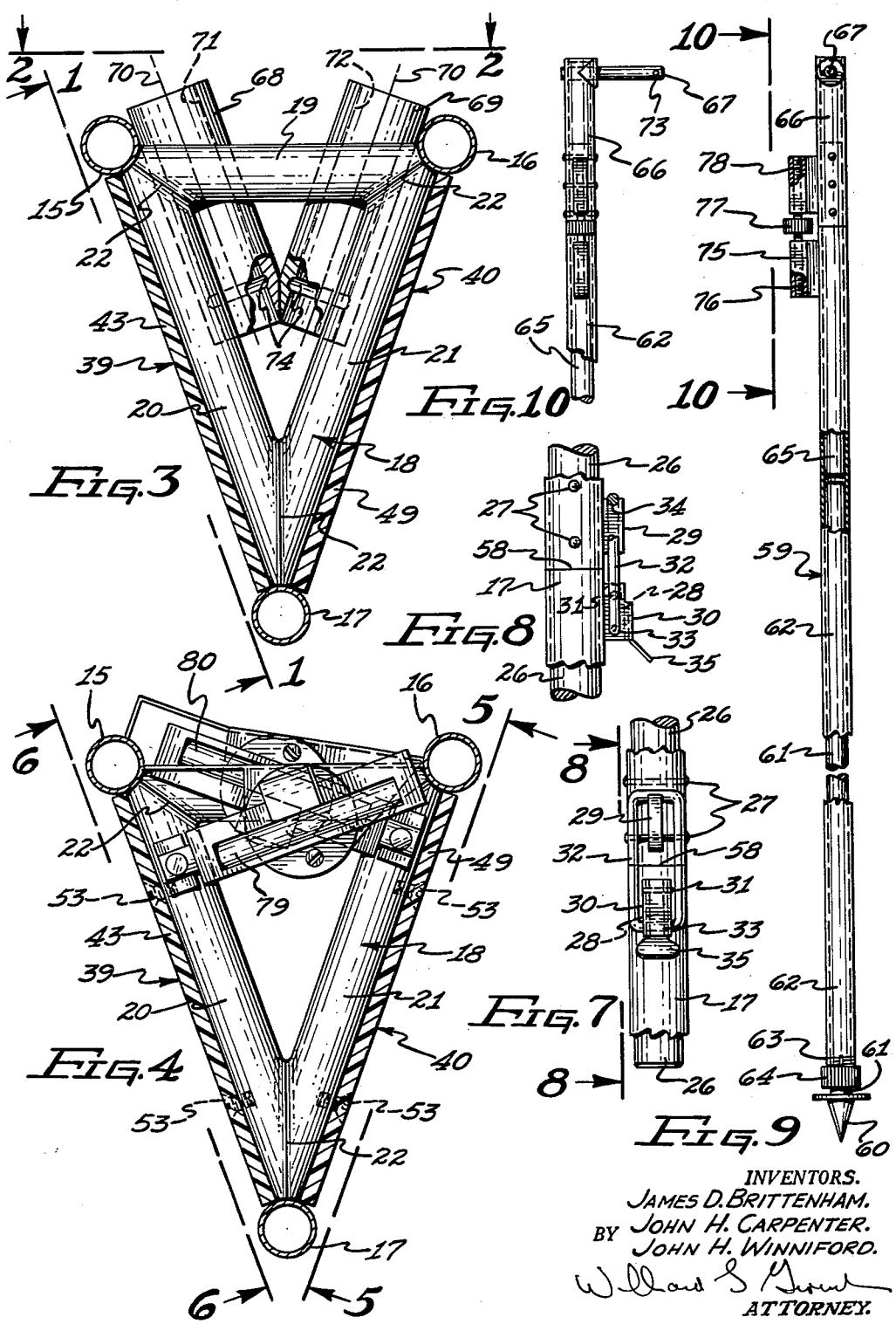

3,110,109
PRECISE STADIA ROD
James D. Brittenham, Phoenix, and John H. Carpenter and John H. Winniford, Glendale, Ariz., assignors, by mesne assignments, of one-half to John H. Carpenter and one-half to John H. Winniford, both of Glendale, Ariz.
Filed Jan. 9, 1961, Ser. No. 81,317
4 Claims. (Cl. 33—74)

This invention pertains to improvements in surveying stadia rods and is particularly directed to a precise stadia rod for such purposes.

One of the objects of this invention is to construct a precise stadia rod which maintains a high degree of accuracy throughout despite great variations in weather conditions during use.

Another object is to provide a precise stadia rod of great strength and ruggedness yet of light weight for use under all types of difficult and rugged conditions.

A further object is to provide a precise stadia rod for trigonometric levels and for precise stadia distance measurements.

It is also an object to provide a precise stadia rod of such accuracy that levels of higher precision than first order as defined by the U.S. Coast and Geodetic Survey may be obtained.

And a further object is to provide a precise stadia rod that has been specially constructed to enable precise plumbing to a high degree of accuracy by complete stabilization in the plane from the instrument to the rod.

It is a further object to achieve the above recited objects to provide a new stadia board incorporating a precise level bubble, preferably of 30″ of arc per mm. of bubble movement, to indicate vertically; a triangular invar steel truss for the frame of the rod; two reading faces and one open face; and a supporting leg attached near the lineal center of the stadia board to provide stability.

Further features and advantages of this invention will appear from a detailed description of the drawings in which:

FIG. 1 is a front elevation of the stadia rod in the direction indicated by the line 1—1 of FIG. 3.

FIG. 2 is a rear elevation of the stadia rod indicated by the line 2—2 of FIG. 3.

FIG. 3 is an enlarged section of the line 3—3 of FIGS. 1 and 2.

FIG. 4 is an enlarged section on the line 4—4 of FIG. 6, and of FIG. 2.

FIG. 5 is an enlarged side elevation of a stadia rod section in the direction indicated by the line 5—5 of FIG. 4.

FIG. 6 is an enlarged side elevation of the stadia rod section indicated by the line 6—6 of FIG. 4.

FIG. 7 is an enlarged fragmentary view showing the clamp device for locking the stadia rod section together.

FIG. 8 is an enlarged fragmentary view of the clamp device indicated by the line 8—8 of FIG. 7.

FIG. 9 is an enlarged view of the extension leg for the stadia rod.

FIG. 10 is a fragmentary view on the line 10—10 of FIG. 9.

As an example of one embodiment of this invention, there is shown a precise stadia rod comprising a main body having three parallel tubular members 15, 16 and 17 which are welded or otherwise formed integral with the corners of a plurality of longitudinally spaced triangular truss members 18 and formed from the tubular members 19, 20 and 21, integrally joined together as by welding at the areas 22. Preferably a material having a low coefficient of expansion, such as invar steel, is utilized to fabricate the triangular truss body just described.

The body of the stadia rod may be a single piece of desired length or may comprise a plurality of sections 23, 24 and 25 (or any additional number of sections as required) demountably secured together by dowel pins 26 fixed in the lower ends of the tubular members 15, 16 and 17 by suitable rivets 27 and slidable telescopically into the tops of the said tubular members next below. Any suitable releasable clamp device may be utilized to hold the sections together such as shown in FIGS. 7 and 8 comprising a lug 28 formed integral with the top end of a tubular member 15, 16 and 17 which is aligned with a similar lug 29 formed integral with the lower end of a tubular member 15, 16 and 17. An apporpriate clamp 30 is pivotally mounted on a pin 31 carried in the upper end of the lug 28 and a hasp 32 is pivotally mounted at 33 on the clamp 30 and is adapted to engage the latch groove 34 on top of the lug when the thumb piece 35 is pressed down to lock the sections 23, 24 and 25 together.

The bottom section 23 has no downwardly extending dowel pins 26 but is provided with a foot piece 36 having an abutment surface 37 upon which the stadia rod is supported during the surveying operations. The top of the foot piece has an integral flange 38 which is rigidly fixed to the bottom triangular truss member 18 and lower ends of the tubular members 15, 16 and 17 of the lower section 23, FIG. 5.

Reading faces 39 and 40 are provided between the tubular members 15—17 and 16—17 comprising plates 41, 42, 43, 44, 45 and 46, and plates 47, 48, 49, 50, 51 and 52. Each of the sections 23, 24 and 25 have two pairs of plates, the bottom section 23 having plate 41—43 and 47—48; section 24 having plates 43—44 and 49—50; and the section 25 having plates 45—46 and 51—52. Each of the plates are made of suitable material such as laminated plastic, having a very low coefficient of expansion. It will be noted that each plate 41–52 is of relative short length and each is individually secured to the legs 20 and 21 of the triangular truss members 18 by appropriate screws 53. An offset joint, as shown particularly at 54, 55 and 56 in FIG. 6 is provided between the two plates of a single section and straight joints are provided at 57 and 58, FIGS. 1 and 2. By this segmented arrangement of the plates on the triangular truss members, a highly accurate and stable stadia rod is provided.

In order to provide means for plumbing the faces of each of the reading faces 39 and 40, there is provided a leg 59 comprising a ground engaging point 60 which is fixed to the lower end of the rod 61 which is telescopically slidable in the tube 62. A collet chuck 63 is formed on the lower end of the tube 62 having a clamp nut 64 which may be manually operated to lock the rod 61 and tube 62 in any desirable relative adjusted position.

The upper end of the tube is provided with a vernier arrangement including a rod 65 telescopically slidable in the upper end of the tube 62, the upper end of the rod 65 having a tube 66 having a mounting pivot pin 67 adapted to be inserted in either of the sockets 68 or 69 rigidly fixed to the triangular truss structure of the stadia rod, FIG. 3. It will be noted that the axes 70 of the bores 71 and 72 of the sockets 68 and 69, respectively, are parallel with the reading faces 39 and 40 of the stadia rod. A suitable radially disposed detent plunger 73 in the pivot pin 67 is adapted to engage the annular grooves 74 in the bores 71 and 72 in the sockets 68 and 69 to demountably secure the leg to the stadia rod. The tube 62 has a lug 75 formed thereon having a threaded bore 76 in which operates the vernier adjusting screw 77 which in turn is threaded at 78 in a lug fixed to the tube 66. When the leg has its pin 67 inserted in a socket 68 or 69 and its ground engaging point inserted in the ground 78 as shown in FIGS. 1 and 2, adjustment of the vernier screw effects precise plumbing of the stadia rod.

Suitable precise levels 79 and 80, FIG. 4, are mounted on the stadia rod with their longitudinal axes of indication at right angles to the respective reading faces 39 and 40 to determine the exact plumb position for the stadia rod.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A precise stadia rod comprising in combination:
   a. three laterally spaced parallel tubular members,
   b. a plurality of longitudinally spaced triangular truss members formed at their corners integrally with said tubular members,
   c. reading face plates fixed to the outside surfaces of the legs of said triangular truss members,
   d. and a ground engaging foot piece fixed to the lower ends of said laterally spaced tubular members to support said stadia rod in plumbed position.

2. A precise stadia rod comprising in combination:
   a. three laterally spaced parallel cylindrical tubular members,
   b. a series of triangular truss members rigidly formed integrally with said tubular members at the intersection of the legs of said triangular truss members,
   c. reading face plates fixed to the legs of said triangular truss members between pairs of said laterally spaced parallel tubular members,
   d. and a ground engaging foot piece carried on the lower ends of said laterally spaced parallel cylindrical tubular members.

3. A precise stadia rod comprising in combination:
   a. three laterally spaced parallel cylindrical tubular members,
   b. a series of triangular truss members having,
   c. cylindrical tubular legs rigidly integrally joined at the intersection of the legs to said laterally spaced parallel cylindrical tubular members,
   d. reading face plates fixed to outside of the tubular legs of said triangular truss members between pairs of said laterally spaced parallel tubular members,
   e. and a foot piece on the bottom ends of said laterally spaced parallel tubular members.

4. A precise stadia rod comprising in combination:
   a. three cylindrical tubular members having laterally spaced parallel longitudinal axes,
   b. a series of triangular truss members formed by cylindrical tubular leg members having longitudinal axes lying in a plane at right angles to the longitudinal axes of said three cylindrical tubular members, said tubular leg members being rigidly fixed at their corners of intersection of the leg members to said three cylindrical tubular members, and
   c. reading face plates fixed to the outside surfaces of said leg members and located laterally between pairs of said three cylindrical tubular members.

References Cited in the file of this patent

UNITED STATES PATENTS

| | | |
|---|---|---|
| 687,200 | Conger | Nov. 26, 1901 |
| 1,174,501 | Hughes et al. | Mar. 7, 1916 |
| 1,827,049 | Tenney | Apr. 4, 1928 |
| 2,058,998 | Koulichkov | Oct. 27, 1936 |
| 2,540,769 | Wattenbarger | Feb. 6, 1951 |

FOREIGN PATENTS

| | | |
|---|---|---|
| 9,361 | Great Britain | Apr. 6, 1901 |
| 698,471 | Great Britain | Oct. 14, 1953 |
| 843,285 | Great Britain | Aug. 4, 1960 |